US012610122B2

(12) United States Patent
Ke et al.

(10) Patent No.: US 12,610,122 B2
(45) Date of Patent: Apr. 21, 2026

(54) OPTICAL SYSTEM

(71) Applicant: TDK TAIWAN CORP., Taoyuan City (TW)

(72) Inventors: Ling Yi Ke, Taoyuan City (TW); Yi-Ho Chen, Taoyuan City (TW); Ya-Hsiu Wu, Taoyuan City (TW); Shu-Shan Chen, Taoyuan City (TW); Pai-Jui Cheng, Taoyuan City (TW); Chao-Chang Hu, Taoyuan City (TW)

(73) Assignee: TDK TAIWAN CORP., Taoyuan City (TW)

(*) Notice: Subject to any disclaimer, the term of this patent is extended or adjusted under 35 U.S.C. 154(b) by 76 days.

(21) Appl. No.: 18/735,553

(22) Filed: Jun. 6, 2024

(65) Prior Publication Data

US 2024/0411204 A1      Dec. 12, 2024

Related U.S. Application Data

(60) Provisional application No. 63/471,602, filed on Jun. 7, 2023.

(51) Int. Cl.
| | |
|---|---|
| *H04N 23/58* | (2023.01) |
| *G02B 26/08* | (2006.01) |
| *H04N 23/55* | (2023.01) |
| *H04N 23/57* | (2023.01) |

(52) U.S. Cl.
CPC ......... *H04N 23/58* (2023.01); *G02B 26/0825* (2013.01); *G02B 26/0833* (2013.01); *G02B 26/085* (2013.01); *G02B 26/0858* (2013.01); *H04N 23/55* (2023.01); *H04N 23/57* (2023.01)

(58) Field of Classification Search
None
See application file for complete search history.

(56) References Cited

U.S. PATENT DOCUMENTS

| | | | | |
|---|---|---|---|---|
| 2007/0285558 A1* | 12/2007 | Oohara | ................ | G02B 27/646 |
| | | | | 348/E5.045 |
| 2015/0009550 A1* | 1/2015 | Misago | ................ | G02B 26/023 |
| | | | | 359/205.1 |
| 2016/0116732 A1* | 4/2016 | Yasuda | ................ | G02B 26/101 |
| | | | | 359/200.7 |
| 2020/0249467 A1* | 8/2020 | Grutzeck | .............. | B81B 3/0021 |
| 2021/0033848 A1* | 2/2021 | Suzuki | ................ | G02B 26/085 |
| 2023/0152668 A1* | 5/2023 | Liu | .......................... | H02N 2/22 |
| | | | | 310/323.17 |
| 2024/0126070 A1* | 4/2024 | Suzuki | ................... | H02K 41/02 |

(Continued)

FOREIGN PATENT DOCUMENTS

| | | | | |
|---|---|---|---|---|
| CN | 115524845 A | * | 12/2022 | ........... G02B 26/105 |

*Primary Examiner* — Paul M Berardesca
(74) *Attorney, Agent, or Firm* — MUNCY, GEISSLER, OLDS & LOWE, P.C.

(57) ABSTRACT

An optical system is provided. The optical system includes a movable part, a fixed part, and a first driving assembly, and a second driving assembly. The movable part connects an optical element. The movable part is movable relative to the fixed part. The first driving assembly and the second driving assembly is for driving the movable part to move. The first driving assembly generates a first driving force to drive the movable part to move in a first dimension. The second driving assembly generates a second driving force to drive the movable part to move in a second dimension.

16 Claims, 9 Drawing Sheets

(56) References Cited

U.S. PATENT DOCUMENTS

2025/0008220 A1 *   1/2025   Perez Noguera ...... H04N 23/55
2025/0130418 A1 *   4/2025   Danesh .............. G02B 26/0858
2025/0280199 A1 *   9/2025   Soundara Pandian ......................
                                                  H04N 23/6812

* cited by examiner

OPTICAL SYSTEM

CROSS REFERENCE TO RELATED APPLICATIONS

This application claims the benefit of U.S. Provisional Application No. 63/471,602, filed 2023 Jun. 7, the entirety of which is incorporated by reference herein.

BACKGROUND OF THE INVENTION

Field of the Invention

The present invention relates to an optical system, and, in particular, it relates to an optical system having a first driving assembly and a second driving assembly for driving the movable part to move relative to the fixed part.

Description of the Related Art

With the recent developments in science and technology, many electronic devices (such as tablets and other computers) nowadays have the functionality of taking pictures and recording videos. The use of these electronic devices is becoming more and more common. In addition to developing products that are more stable and have better optical quality, they are also moving towards convenient and thinner designs to provide users with more choice. The design of electronic devices continues to move towards miniaturization, so that various elements or their structures used in optical modules such as cameras must also continue to shrink in order to achieve miniaturization. In view of this, how to design a miniaturized optical system has become an important issue.

BRIEF SUMMARY OF THE INVENTION

The term "embodiment" and like terms, e.g., implementation, configuration, aspect, example, and option, are intended to refer broadly to all of the subject matter of this disclosure and the claims below. Statements containing these terms should be understood not to limit the subject matter described herein or to limit the meaning or scope of the claims below. Embodiments of the present disclosure covered herein are defined by the claims below, not this summary. This summary is a high-level overview of various aspects of the disclosure and introduces some of the concepts that are further described in the Detailed Description section below. This summary is not intended to identify key or essential features of the claimed subject matter. This summary is also not intended to be used in isolation to determine the scope of the claimed subject matter. The subject matter should be understood by reference to appropriate parts of the entire specification of this disclosure, any or all drawings, and each claim.

According to certain aspects of the present disclosure, an optical system is provided. The optical system includes a movable part, a fixed part, and a first driving assembly. The movable part connects an optical element. The movable part is movable relative to the fixed part. The first driving assembly is for driving the movable part to move.

In some embodiments of the present disclosure, the optical system further includes a second driving assembly. The second driving assembly is for driving the movable part to move. The first driving assembly generates a first driving force to drive the movable part to move in a first dimension.

The second driving assembly generates a second driving force to drive the movable part to move in a second dimension.

In some embodiments of the present disclosure, the first driving assembly includes a first driving element. When the first driving assembly generates the first driving force, the first driving element does not deform.

In some embodiments of the present disclosure, the second driving assembly includes a second driving element. When the second driving assembly generates the second driving force, the second driving element deforms.

In some embodiments of the present disclosure, the movable part includes a first area, and a second area. The first area undergoes a first deformation when the movable part moves in the first dimension. The second area undergoes a second deformation when the movable part moves in the first dimension. The magnitude of the first deformation is different from the magnitude of the second deformation.

In some embodiments of the present disclosure, the second driving element is disposed in the first area. The second driving element is not disposed in the second area. The magnitude of the first deformation is greater than the magnitude of the second deformation.

In some embodiments of the present disclosure, the movable part further includes a third area. When the movable part moves in the first dimension, the third area undergoes a third deformation. The magnitude of the third deformation is different from the magnitude of the second deformation. The magnitude of the third deformation is the same as the magnitude of the first deformation. The first area and the third area are located on opposite sides of the center of the optical element.

In some embodiments of the present disclosure, the second driving assembly further includes a third driving element disposed in the second area. A gap is formed between the second driving element and the third driving element. The magnitude of the third deformation is greater than the magnitude of the second deformation.

In some embodiments of the present disclosure, the movable part further includes a fourth area. When the movable part moves in the first dimension, the fourth area undergoes a fourth deformation. The magnitude of the fourth deformation is different from the magnitude of the second deformation. The second driving assembly further includes a fifth driving element disposed in the fourth area. The magnitude of the fourth deformation is greater than the magnitude of the second deformation. The magnitude of the fourth deformation is the same as the magnitude of the first deformation.

In some embodiments of the present disclosure, the movable part further includes a supporting part, a main body, and a middle part. The main body is movable relative to the fixed part through the supporting part. The middle part is located between the supporting part and the main body. The first area and the fourth area are located on opposite sides of the middle part.

In some embodiments of the present disclosure, when the movable part moves in the first dimension, the supporting part undergoes a supporting deformation. The magnitude of the supporting deformation is different from the magnitude of the second deformation. The second driving assembly further includes a supporting driving element, the supporting driving element is disposed on the supporting part. The magnitude of the supporting deformation is greater than the magnitude of the first deformation.

In some embodiments of the present disclosure, the optical further includes a position sensing assembly for sensing the movement of the movable part. The position sensing assembly has piezoelectric material. The position sensing assembly is disposed on the second area.

In some embodiments of the present disclosure, the optical further includes an auxiliary sensing assembly for sensing the movement of the movable part. The auxiliary sensing assembly is disposed on the supporting part. The auxiliary sensing assembly includes a first auxiliary sensing element and a second auxiliary sensing element. A capacitance is formed between the first auxiliary sensing element and the second auxiliary sensing element. The capacitance value changes when the movable part moves.

In some embodiments of the present disclosure, the first driving assembly is for driving the movable part to move relative to the fixed part in a first range of motion. The first range of motion includes a first forward range and a first reverse range. The absolute values of the first forward range and the first reverse range are the same.

In some embodiments of the present disclosure, the second driving assembly is for driving the movable part to move relative to the fixed part in a second range of motion. The second range of motion includes a second forward range and a second reverse range. The absolute values of the second forward range and the second reverse range are different.

In some embodiments of the present disclosure, the first range of motion is different from the second range of motion. The first range of motion is greater than the second range of motion.

In some embodiments of the present disclosure, the first driving assembly and the second driving assembly are for simultaneously driving the movable part to move within a limit range relative to the fixed par. The limit range is greater than the first range of motion. The limit range is greater than the second range of motion.

In some embodiments of the present disclosure, the first driving assembly is disposed on a first movable part surface of the movable part. The second driving assembly is disposed on a second movable part surface of the movable part. The first movable part surface and the second movable part surface face different directions. When viewed along the direction perpendicular to the first movable part surface, the first driving assembly and the second driving assembly at least partially overlap.

In some embodiments of the present disclosure, the second driving assembly has piezoelectric material or shape memory alloys.

In some embodiments of the present disclosure, the optical system further includes a control assembly. The control assembly sends a first driving signal to the first driving assembly to generate the first driving force. The control assembly sends a second driving signal to the second driving assembly to generate the second driving force. The first driving signal and the second driving signal are periodic signals. The first driving signal and the second driving signal have the same period. The first driving signal and the second driving signal have different phases.

The above summary is not intended to represent each embodiment or every aspect of the present disclosure. Rather, the foregoing summary merely provides an example of some of the novel aspects and features set forth herein. The above features and advantages, and other features and advantages of the present disclosure, will be readily apparent from the following detailed description of representative embodiments and modes for carrying out the present invention, when taken in connection with the accompanying drawings and the appended claims. Additional aspects of the disclosure will be apparent to those of ordinary skill in the art in view of the detailed description of various embodiments, which is made with reference to the drawings, a brief description of which is provided below.

BRIEF DESCRIPTION OF THE DRAWINGS

The disclosure, and its advantages and drawings, will be better understood from the following description of representative embodiments together with reference to the accompanying drawings. These drawings depict only representative embodiments, and are therefore not to be considered as limitations on the scope of the various embodiments or claims.

DETAILED DESCRIPTION OF THE INVENTION

Figure 1:
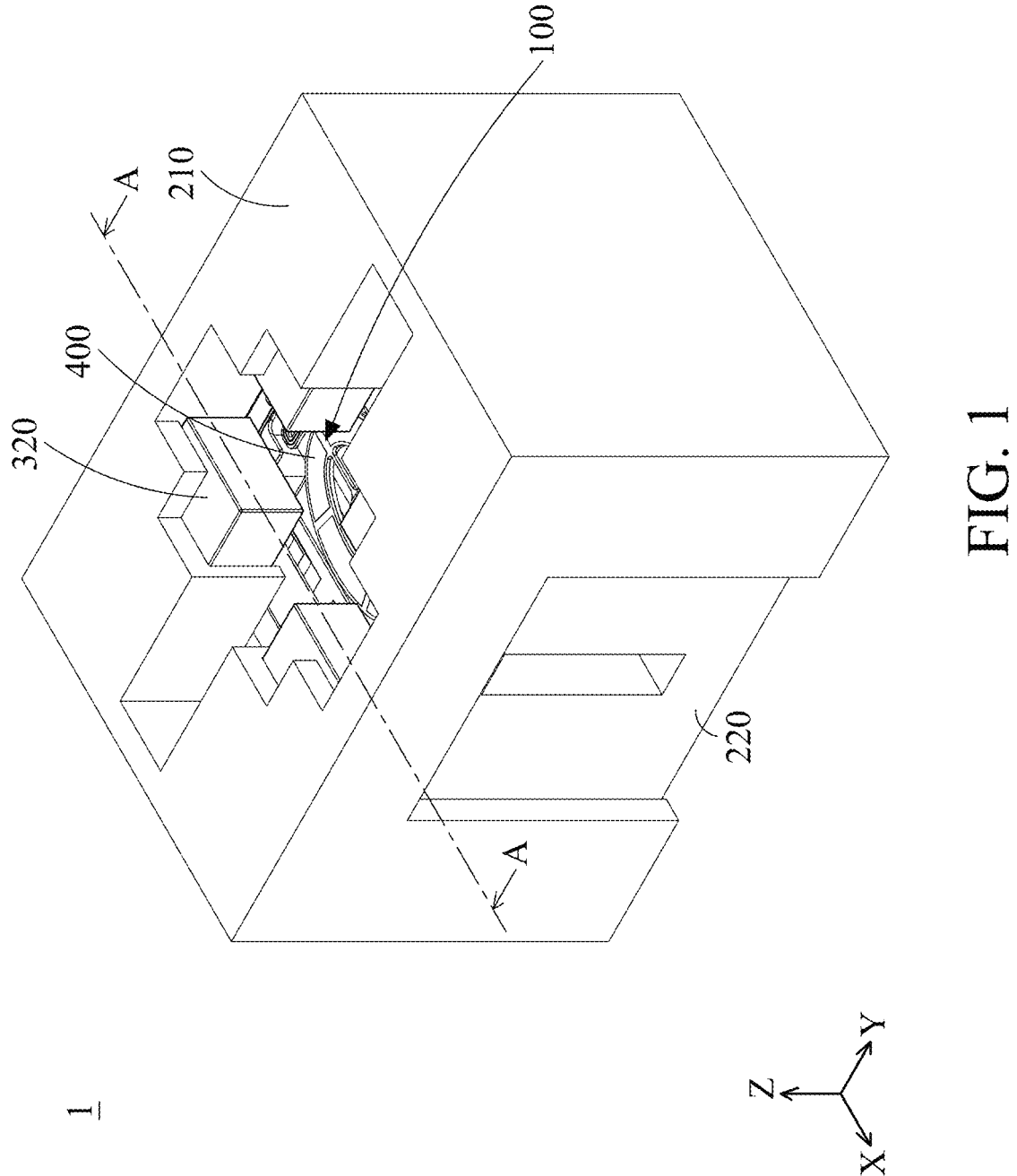
FIG. 1 is a front perspective view of an optical system, according to certain aspects of the present disclosure.

Various embodiments are described with reference to the attached figures, where like reference numerals are used throughout the figures to designate similar or equivalent elements. The figures are not necessarily drawn to scale and are provided merely to illustrate aspects and features of the present disclosure. Numerous specific details, relationships, and methods are set forth to provide a full understanding of certain aspects and features of the present disclosure, although one having ordinary skill in the relevant art will recognize that these aspects and features may be practiced without one or more of the specific details, with other relationships, or with other methods. In some instances, well-known structures or operations are not shown in detail for illustrative purposes. The various embodiments disclosed herein are not necessarily limited by the illustrated ordering of acts or events, as some acts may occur in different orders and/or concurrently with other acts or events. Furthermore, not all illustrated acts or events are necessarily required to implement certain aspects and features of the present disclosure.

For purposes of the present detailed description, unless specifically disclaimed, and where appropriate, the singular includes the plural and vice versa. The word "including" means "including without limitation." Moreover, words of approximation, such as "about," "almost," "substantially," "approximately," and the like, may be used herein to mean "at," "near," "nearly at," "within 3-5% of," "within acceptable manufacturing tolerances of," or any logical combination thereof. Similarly, terms "vertical" or "horizontal" are intended to additionally include "within 3-5% of" a vertical or horizontal orientation, respectively. Additionally, words of direction, such as "top," "bottom," "left," "right," "above," and "below" are intended to relate to the equivalent direction as depicted in a reference illustration; as understood contextually from the object(s) or element(s) being referenced, such as from a commonly used position for the object(s) or element(s); or as otherwise described herein.

Figure 2:
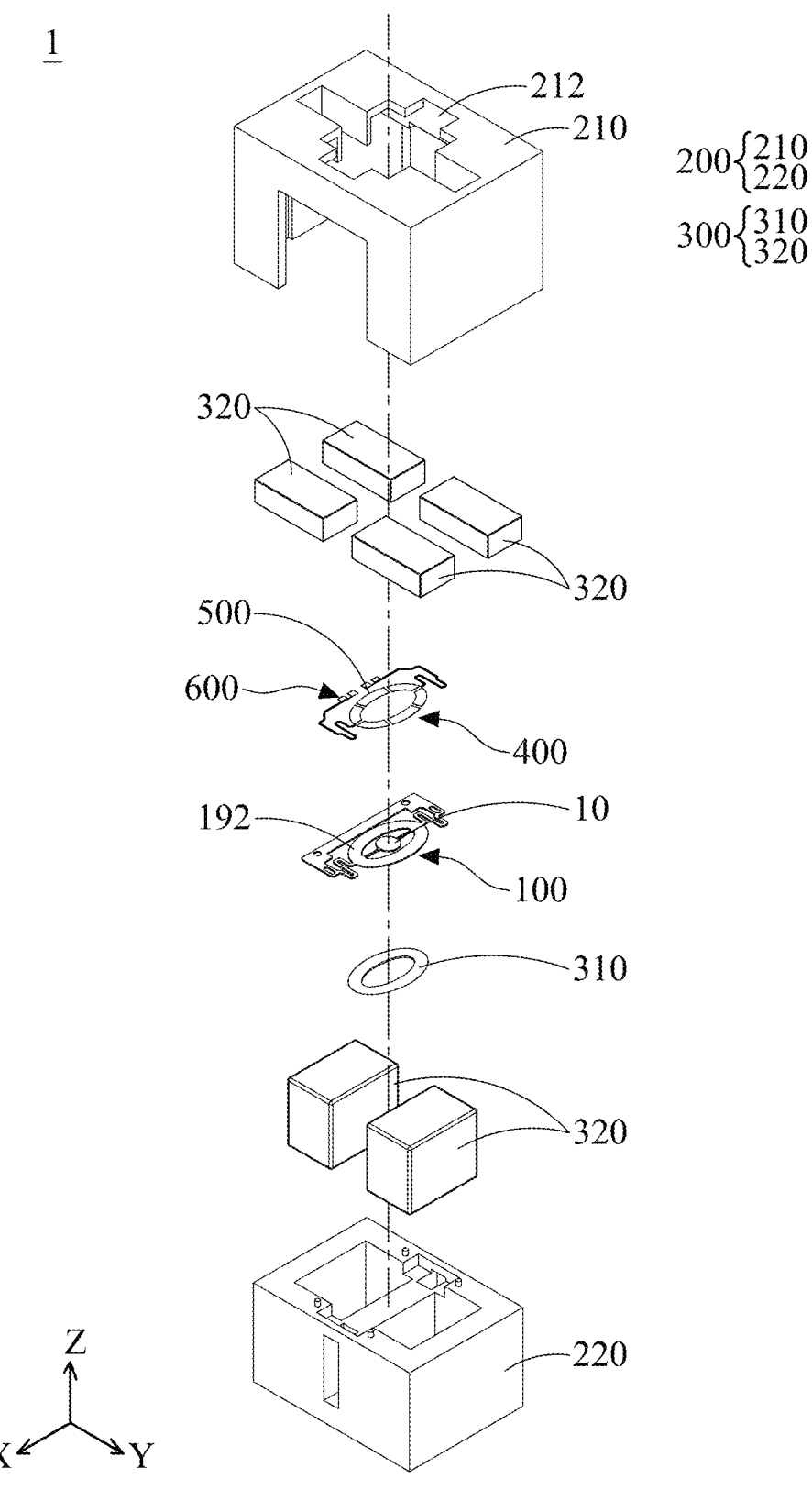
FIG. 2 is an exploded perspective view of the optical system and an optical element, according to certain aspects of the present disclosure.

Please refer to FIG. 1 and FIG. 2. FIG. 1 is a front perspective view of an optical system 1, according to certain aspects of the present disclosure. FIG. 2 is an exploded perspective view of the optical system 1 and an optical element 10, according to certain aspects of the present disclosure.

Figure 8:
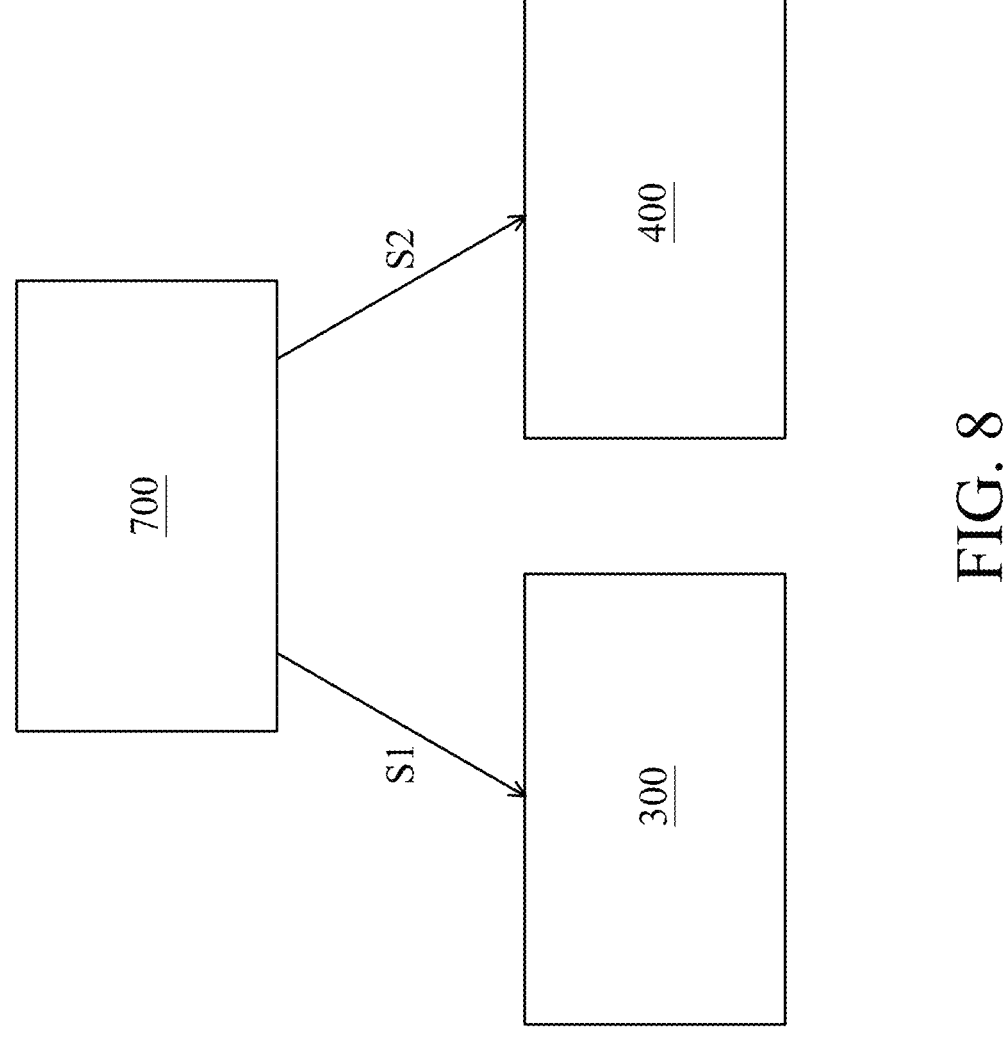
FIG. 8 is a block diagram of the control assembly sending the signals to the first driving assembly and the second driving assembly, according to certain aspects of the present disclosure.

The optical system 1 includes a movable part 100, a fixed part 200, a first driving assembly 300, a second driving assembly 400, a position sensing assembly 500, an auxiliary sensing assembly 600, and a control assembly 700 (shown in FIG. 8). The movable part 100 connects the optical element 10. The movable part 100 is movable relative to the fixed part 200. The first driving assembly 300 and the second driving assembly 400 are for driving the movable part 100 to move. The position sensing assembly 500 is for sensing the movement of the movable part 100. The auxiliary sensing assembly 600 is for sensing the movement of the movable part 100.

Figure 3:
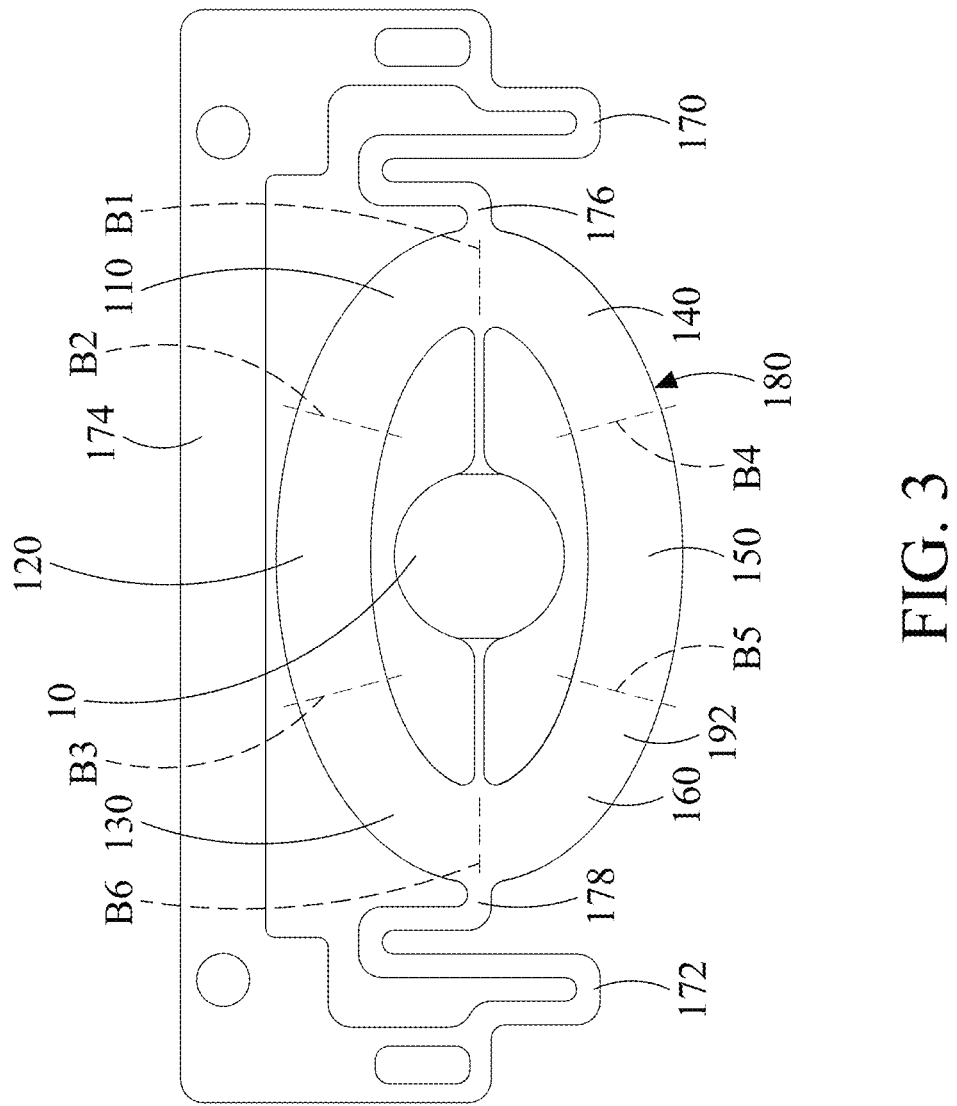
FIG. 3 is a top view of a movable part and the optical element, according to certain aspects of the present disclosure.

Next, please refer to FIG. 3 and FIG. 2 together. FIG. 3 is a top view of the movable part 100 and the optical element 10, according to certain aspects of the present disclosure. The movable part 100 includes a first area 110, a second area 120, a third area 130, a fourth area 140, a fifth area 150, a sixth area 160, two supporting parts 170 and 172, a connecting part 174, two middle parts 176 and 178, a first movable part surface 190 (shown in FIG. 4), and a second movable part surface 192. The first area 110, the second area 120, the third area 130, the fourth area 140, the fifth area 150, and the sixth area 160 integrally form a main body 180. The line B2 in FIG. 3 separates the first area 110 and the second area 120. The line B3 in FIG. 3 separates the second area 120 and the third area 130. The line B1 in FIG. 3 separates the first area 110 and the fourth area 140. The line B4 in FIG. 3 separates the fourth area 140 and the fifth area 150. The line B5 in FIG. 3 separates the fifth area 150 and the sixth area 160. The line B6 in FIG. 3 separates the third area 130 and the sixth area 160.

The first area 110 and the third area 130 of the movable part 100 are located on opposite sides of the center of the optical element 10. The main body 180 is movable relative to the fixed part 200 through the supporting parts 170 and 172. The supporting parts 170 and 172 are connected by the connecting part 174 and the main body 180. The middle parts 176 is located between the supporting part 170 and the main body 180. The middle parts 178 is located between the supporting part 172 and the main body 180. The middle part 176 is at one end of the supporting part 170. The middle part 178 is at one end of the supporting part 172. The first area 110 and the fourth area 140 are located on opposite sides of the middle part 176. The third area 130 and the sixth area 160 are located on opposite sides of the middle part 178.

Figure 4:
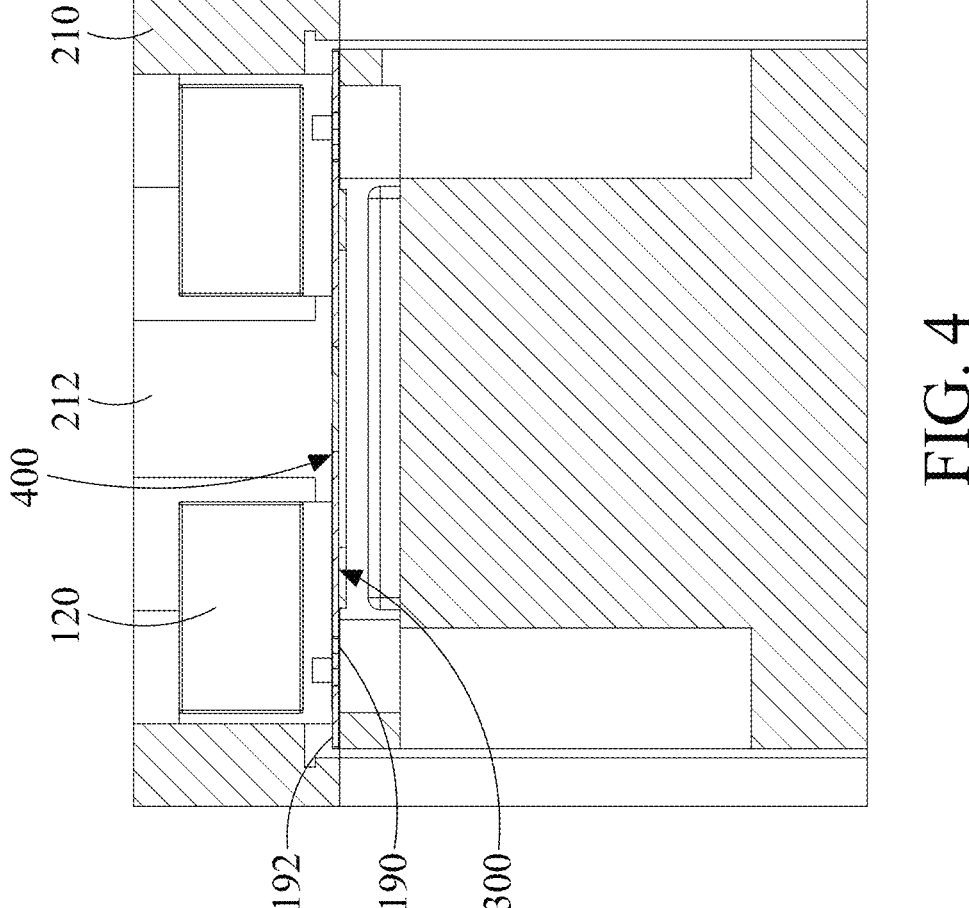
FIG. 4 is a cross-sectional view of the optical system along line A-A in FIG. 1, according to certain aspects of the present disclosure.

Please refer to FIG. 4 next. FIG. 4 is a cross-sectional view of the optical system 1 along line A-A in FIG. 1, according to certain aspects of the present disclosure. The first movable part surface 190 and the second movable part surface 192 face different directions. When viewed along the direction perpendicular to the first movable part surface 190, i.e., when viewed from the Z-axis, the first driving assembly 300 and the second driving assembly 400 at least partially overlap.

Please refer back to FIG. 2. The fixed part 200 includes an outer cover 210 and an outer frame 220. The outer cover 210 has an opening 212 for letting the light pass through the outer cover 210 and enter the optical system 1, finally arriving at the optical element 10. The outer frame 220 is for accommodating the components of the optical system 1 and the optical element 10.

The first driving assembly 300 includes a first driving element 310 and a plurality of magnetic elements 320. The first driving element 310 is disposed on the first movable part surface 190 (shown in FIG. 4) of the movable part 100. In this embodiment, the first driving element 310 is a coil.

The first driving assembly 300 generates a first driving force to drive the movable part 100 to move in a first dimension. By the electromagnetic driving force generated by the magnetic elements 320 and the first driving element 310 of the driving assembly 300, the movable part 100 may move in the first dimension relative to the fixed part 200. When the first driving assembly 300 generates the first driving force, the first driving element 310 does not deform.

When the movable part 100 moves in the first dimension, the first area 110 of the movable part 100 undergoes a first deformation, the second area 120 of the movable part 100 undergoes a second deformation, the third area 130 of the movable part 100 undergoes a third deformation, the fourth area 140 of the movable part 100 undergoes a fourth deformation, and the supporting part 170 of the movable part 100 undergoes a supporting deformation.

The magnitude of the first deformation is different from the magnitude of the second deformation. Alternatively, the magnitude of the first deformation is greater than the magnitude of the second deformation.

The magnitude of the third deformation is different from the magnitude of the second deformation. The magnitude of the third deformation is the same as the magnitude of the first deformation. Alternatively, the magnitude of the third deformation is greater than the magnitude of the second deformation.

The magnitude of the fourth deformation is different from the magnitude of the second deformation. Alternatively, the magnitude of the fourth deformation is greater than the magnitude of the second deformation. The magnitude of the fourth deformation is the same as the magnitude of the first deformation.

The magnitude of the supporting deformation is different from the magnitude of the second deformation. Alternatively, the magnitude of the supporting deformation is greater than the magnitude of the first deformation. In addition, the magnitude of deformation includes physical deformations such as length, bending, torsion, etc.

Figure 5:
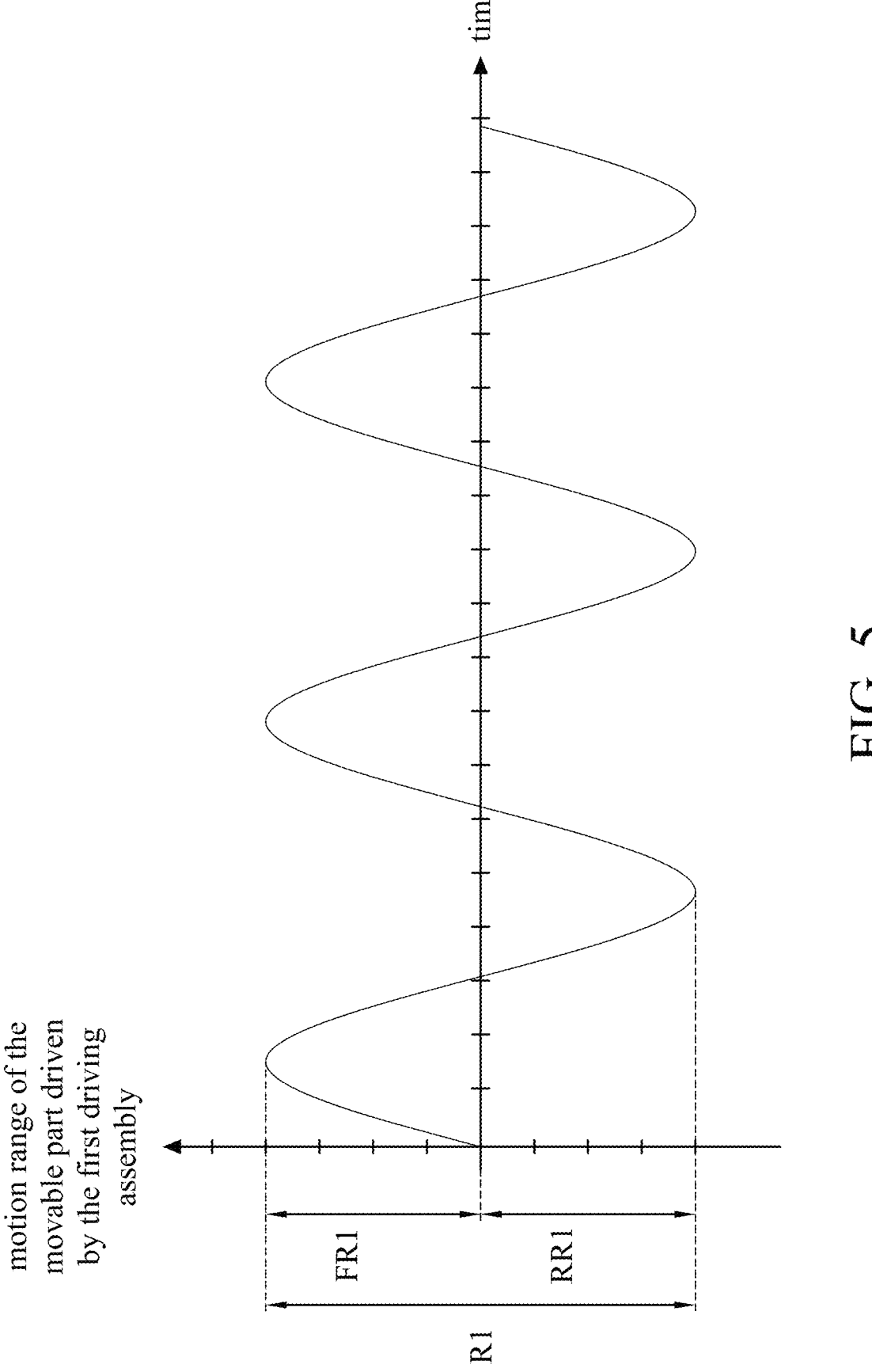
FIG. 5 is a schematic graph of the motion range of the movable part driven by a first driving assembly, according to certain aspects of the present disclosure.

Please refer to FIG. 5 next. FIG. 5 is a schematic graph of the motion range of the movable part 100 driven by the first driving assembly 300, according to certain aspects of the present disclosure. The first driving assembly 300 drives the movable part 100 to move relative to the fixed part 200 in a first range of motion R1. The first range of motion R1 includes a first forward range FR1 and a first reverse range RR1. The absolute values of the first forward range FR1 and the first reverse range RR1 are the same.

Figure 6:
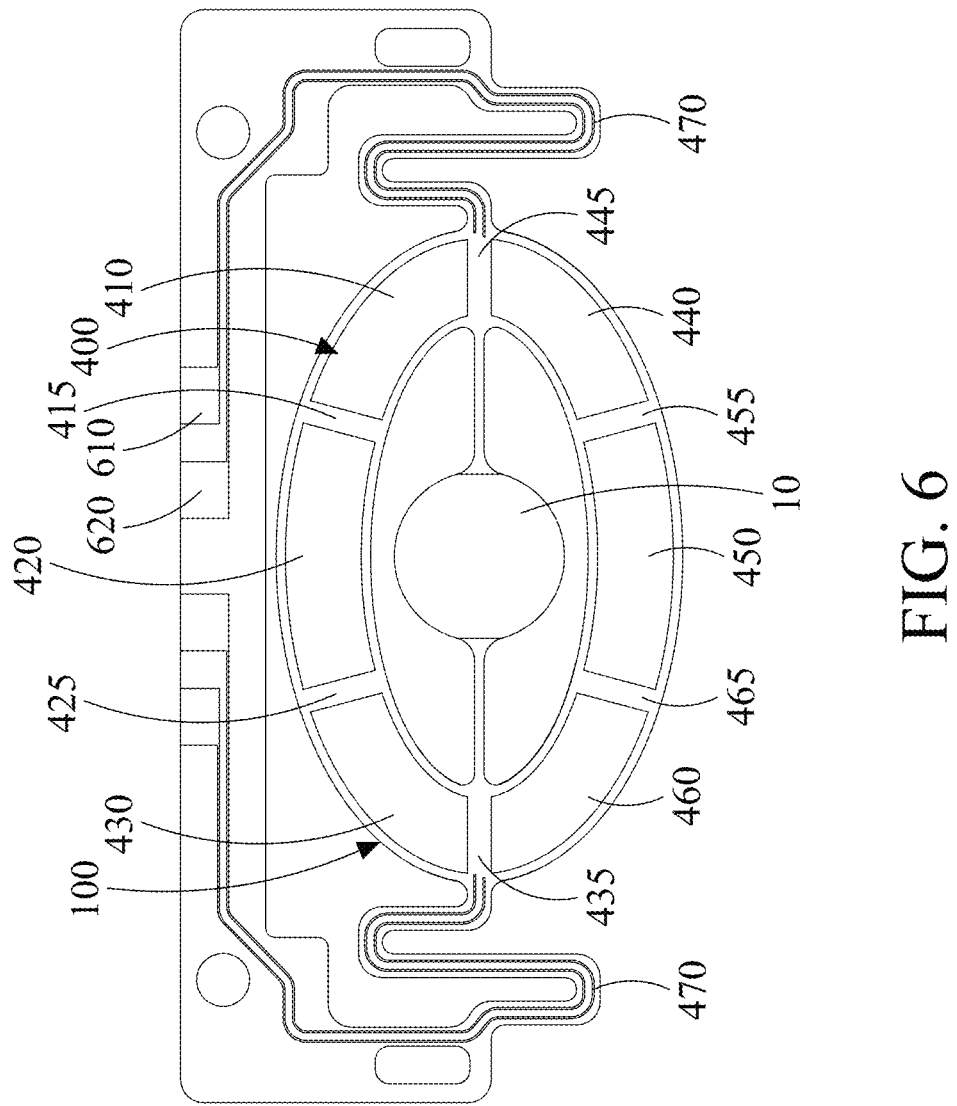
FIG. 6 is a top view of the movable part, the optical element, and a second driving assembly, according to certain aspects of the present disclosure.

Please refer FIG. 2 and FIG. 6 together. FIG. 6 is a top view of the movable part 100, the optical element 10, and the second driving assembly 400, according to certain aspects of the present disclosure. The second driving assembly 400 is disposed on the second movable part surface 192 of the movable part 100. The second driving assembly 400 includes a second driving element 410, a third driving element 420, a fourth driving element 430, a fifth driving element 440, a sixth driving element 450, a seventh driving element 460, and a plurality of supporting driving elements 470. The second driving assembly 400 has piezoelectric material. That is, in this embodiment, the second driving assembly 400 is made of piezoelectric material. Alternatively, the second driving assembly 400 is made of shape memory alloys.

A gap 415 is formed between the second driving element 410 and the third driving element 420. A gap 425 is formed between the third driving element 420 and the fourth driving element 430. A gap 435 is formed between the fourth driving element 430 and the seventh driving element 460. A gap 445 is formed between the second driving element 410 and the fifth driving element 440. A gap 455 is formed between fifth driving element 440 and the sixth driving element 450. A gap 465 is formed between the sixth driving element 450 and the seventh driving element 460.

Please refer to FIG. 3 and FIG. 6 together. The second driving element 410 is disposed in the first area 110 of the movable part 100. The second driving element 410 is not disposed in the second area 120 of the movable part 100. The second driving element 410 is not disposed in the areas outside the first area 110.

The third driving element 420 is disposed in the second area 120 of the movable part 100. Same as the second driving element 410, the third driving element 420 is not disposed in the third area 130 of the movable part 100. The third driving element 420 is not disposed in the areas outside the second area 120.

The fourth driving element 430 is disposed in the third area 130 of the movable part 100. The fourth driving element 430 is not disposed in the fourth area 140 of the movable part 100. The fourth driving element 430 is not disposed in the areas outside the third area 130.

The fifth driving element 440 is disposed in the fourth area 140 of the movable part 100. The fifth driving element 440 is not disposed in the fifth area 150 of the movable part 100. The fifth driving element 440 is not disposed in the areas outside the fourth area 140.

The sixth driving element 450 is disposed in the fifth area 150 of the movable part 100. The sixth driving element 450 is not disposed in the sixth area 160 of the movable part 100. The sixth driving element 450 is not disposed in the areas outside the fifth area 150.

The seventh driving element 460 is disposed in the sixth area 160 of the movable part 100. The seventh driving element 460 is not disposed in the first area 110 of the movable part 100. The seventh driving element 460 is not disposed in the areas outside the sixth area 160. One supporting driving element 470 is disposed on the supporting part 170 of the movable part 100, and another supporting driving element 470 is disposed on the supporting part 172 of the movable part 100.

The second driving assembly 400 generates a second driving force to drive the movable part 100 to move in a second dimension. When the second driving assembly 400 generates the second driving force, the second driving element 410 deforms, as well as the third driving element 420, the fourth driving element 430, the fifth driving element 440, the sixth driving element 450, and the seventh driving element 460.

Figure 7:
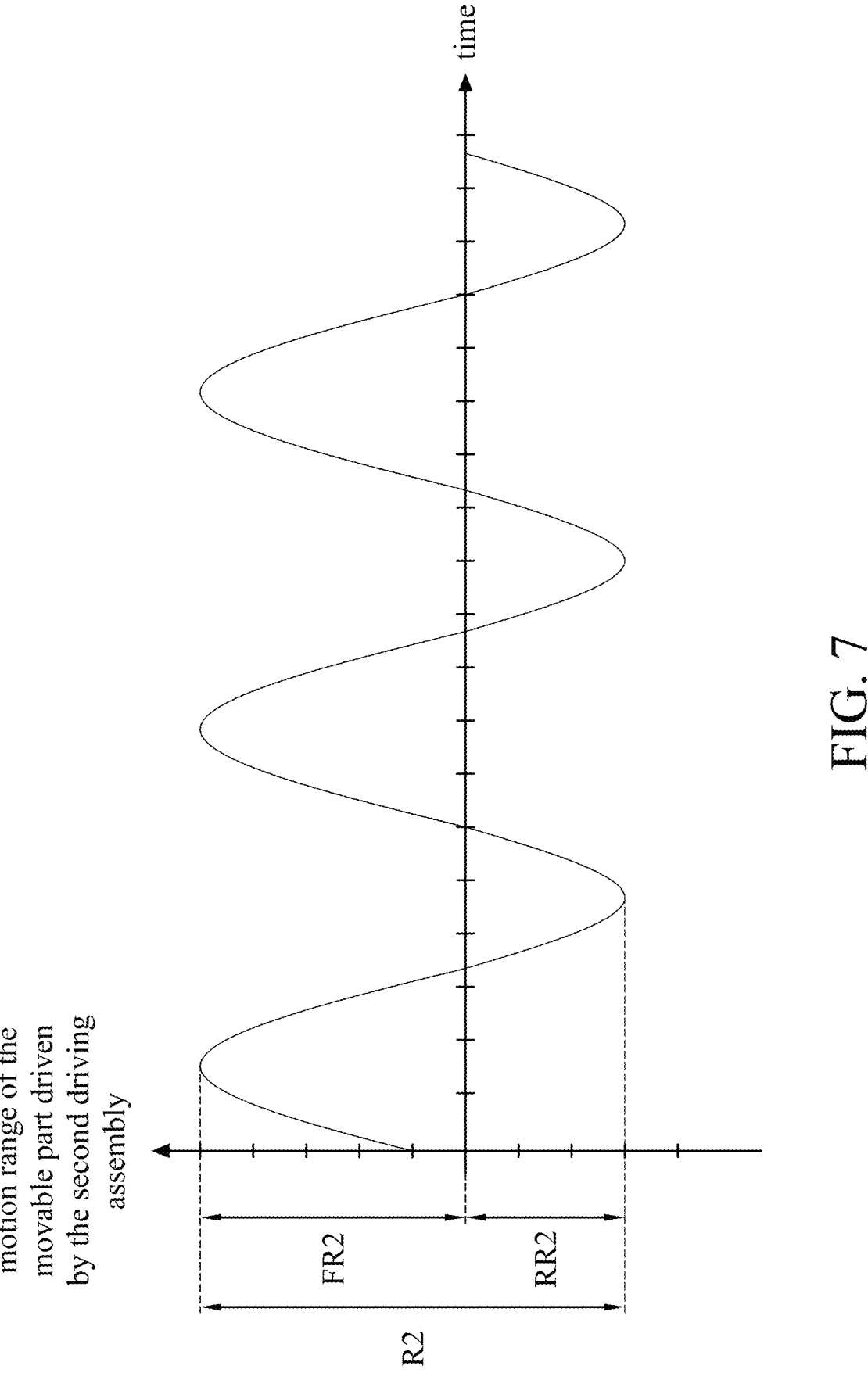
FIG. 7 is a schematic graph of the motion range of the movable part driven by the second driving assembly, according to certain aspects of the present disclosure.

Please refer to FIG. 7 next. FIG. 7 is a schematic graph of the motion range of the movable part 100 driven by the second driving assembly 400, according to certain aspects of the present disclosure. The second driving assembly 400 drives the movable part 100 to move relative to the fixed part 200 in a second range of motion R2. The second range of motion R2 includes a second forward range FR2 and a second reverse range RR2. The absolute values of the second forward range FR2 and the second reverse range RR2 are different.

Next, please refer to FIG. 5 and FIG. 7 together. The first range of motion R1 is different from the second range of motion R2. Alternatively, the first range of motion R1 is greater than the second range of motion R2.

The first driving assembly 300 and the second driving assembly 400 are for simultaneously driving the movable part 100 to move within a limit range relative to the fixed part 200. The limit range is greater than the first range of motion R1. The limit range is greater than the second range of motion R2.

Please refer back to FIG. 2 and FIG. 6 next. The position sensing assembly 500 has piezoelectric material. The position sensing assembly 500 is disposed on the second area 120 of the movable part 100. The auxiliary sensing assembly 600 is disposed on the supporting part 170 of the movable part 100. The auxiliary sensing assembly 600 includes a first auxiliary sensing element 610 and a second auxiliary sensing element 620. A capacitance is formed between the first auxiliary sensing element 610 and the second auxiliary sensing element 620. The capacitance value changes when the movable part 100 moves.

Figure 9:
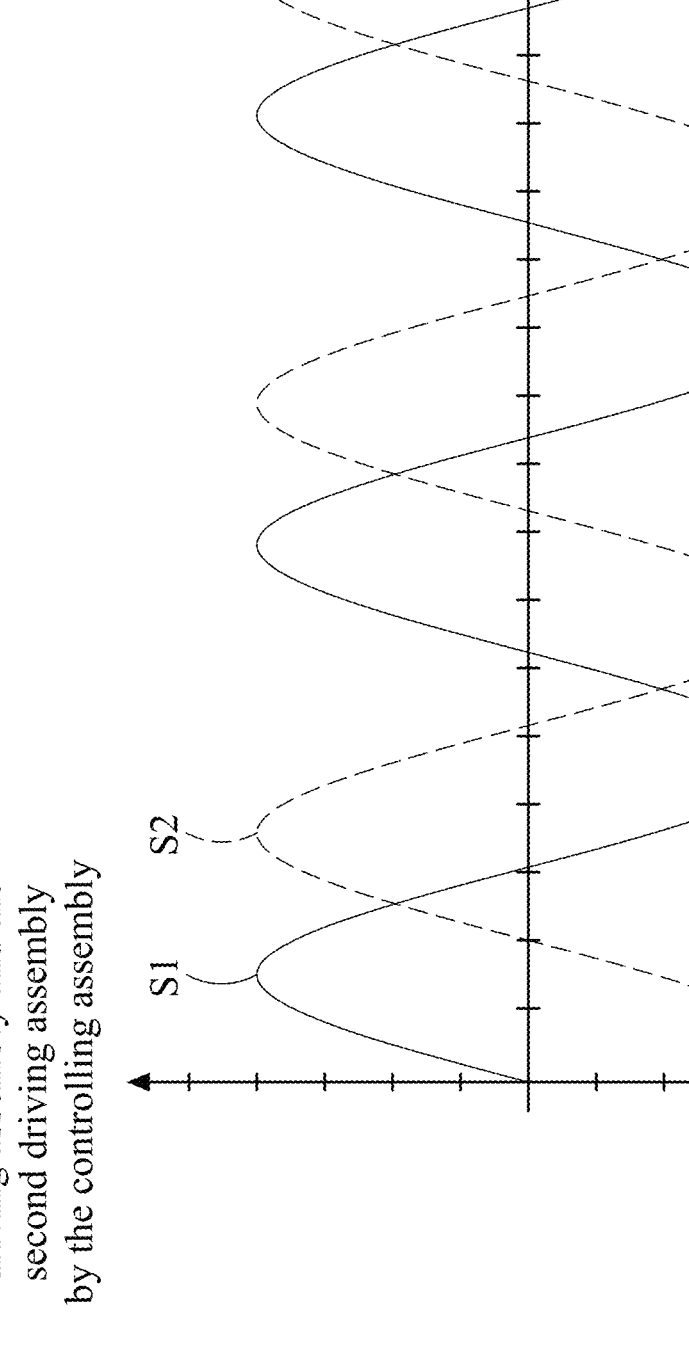
FIG. 9 is a schematic graph of the signals sent to the first driving assembly and the second driving assembly by the control assembly, according to certain aspects of the present disclosure.

Next, please refer to FIG. 8 and FIG. 9. FIG. 8 is a block diagram of the control assembly 700 sending a first driving signal S1 to the first driving assembly 300 and a second driving signal S2 to the second driving assembly 400, according to certain aspects of the present disclosure. FIG. 9 is a schematic graph of the signals sent to the first driving assembly 300 and the second driving assembly 400 by the control assembly 700, according to certain aspects of the present disclosure.

The control assembly 700 sends a first driving signal S1 to the first driving assembly 300 to generate the first driving force. The control assembly 700 sends a second driving signal S2 to the second driving assembly 400 to generate the second driving force. The first driving signal S1 and the second driving signal S2 are periodic signals. The first driving signal S1 and the second driving signal S2 have the same period. The first driving signal S1 and the second driving signal S2 have different phases.

In summary, according to certain aspects of the present disclosure, the optical system and the optical element are described. The optical system includes a movable part, a fixed part, two driving assemblies, and two sensing assemblies including a position sensing assembly and an auxiliary sensing assembly.

According to certain aspects of the present disclosure, the movable part is driven by the driving assemblies to move relative to the fixed part, and the sensing assembly may sense the position of the movable part. Using signals sent by the control assembly to the driving assemblies, the motion of the movable part and the optical element may be controlled.

Although the disclosed embodiments have been illustrated and described with respect to one or more implementations, equivalent alterations and modifications will occur or be known to others skilled in the art upon the reading and understanding of this specification and the annexed drawings. In addition, while a particular feature of the invention may have been disclosed with respect to only one of several implementations, such feature may be combined with one or more other features of the other implementations as may be desired and advantageous for any given or particular application.

While various embodiments of the present disclosure have been described above, it should be understood that they have been presented by way of example only, and not limitation. Numerous changes to the disclosed embodiments may be made in accordance with the disclosure herein, without departing from the spirit or scope of the disclosure. Thus, the breadth and scope of the present disclosure should not be limited by any of the above-described embodiments. Rather, the scope of the disclosure should be defined in accordance with the following claims and their equivalents.

The terminology used herein is for the purpose of describing particular examples only and is not intended to be limiting of the disclosure. As used herein, the singular forms "a," "an," and "the" are intended to include the plural forms as well, unless the context clearly indicates otherwise. Furthermore, to the extent that the terms "including," "includes," "having," "has," "with," or variants thereof, are used in either the detailed description and/or the claims, such terms are intended to be inclusive in a manner similar to the term "comprising.".

What is claimed is:

1. An optical system, comprising:
a movable part, connecting an optical element;
a fixed part, wherein the movable part is movable relative to the fixed part;
a first driving assembly, for driving the movable part to move, wherein the first driving assembly generates a first driving force to drive the movable part to move in a first dimension; and
a second driving assembly, for driving the movable part to move, wherein the second driving assembly generates a second driving force to drive the movable part to move in a second dimension, the second driving assembly includes a second driving element, and when the second driving assembly generates the second driving force, the second driving element deforms,
wherein the movable part includes:
a first area, wherein the first area undergoes a first deformation when the movable part moves in the first dimension; and
a second area, wherein the second area undergoes a second deformation when the movable part moves in the first dimension,
wherein the magnitude of the first deformation is different from the magnitude of the second deformation,
wherein the second driving element is disposed in the first area,
wherein the second driving element is not disposed in the second area, and
wherein the magnitude of the first deformation is greater than the magnitude of the second deformation.

2. The optical system as claimed in claim 1, wherein the first driving assembly includes a first driving element, and when the first driving assembly generates the first driving force, the first driving element does not deform.

3. The optical system as claimed in claim 1, wherein the movable part further includes a third area; and when the movable part moves in the first dimension, the third area undergoes a third deformation;
the magnitude of the third deformation is different from the magnitude of the second deformation;
the magnitude of the third deformation is the same as the magnitude of the first deformation; and
the first area and the third area are located on opposite sides of the center of the optical element.

4. The optical system as claimed in claim 3, wherein:
the second driving assembly further includes a third driving element disposed in the second area;
a gap is formed between the second driving element and the third driving element; and
the magnitude of the third deformation is greater than the magnitude of the second deformation.

5. The optical system as claimed in claim 3, wherein the movable part further includes a fourth area; and when the movable part moves in the first dimension, the fourth area undergoes a fourth deformation:
the magnitude of the fourth deformation is different from the magnitude of the second deformation;
the second driving assembly further includes a fifth driving element disposed in the fourth area;
the magnitude of the fourth deformation is greater than the magnitude of the second deformation; and
the magnitude of the fourth deformation is the same as the magnitude of the first deformation.

6. The optical system as claimed in claim 5, wherein the movable part further includes a supporting part, a main body, and a middle part;
wherein the main body is movable relative to the fixed part through the supporting part;
the middle part is located between the supporting part and the main body; and
the first area and the fourth area are located on opposite sides of the middle part.

7. The optical system as claimed in claim 6, wherein:
when the movable part moves in the first dimension, the supporting part undergoes a supporting deformation;
the magnitude of the supporting deformation is different from the magnitude of the second deformation;
the second driving assembly further includes a supporting driving element, wherein the supporting driving element is disposed on the supporting part; and
the magnitude of the supporting deformation is greater than the magnitude of the first deformation.

8. The optical system as claimed in claim 1, further comprising a position sensing assembly for sensing the movement of the movable part, wherein the position sensing assembly has piezoelectric material, and the position sensing assembly is disposed on the second area.

9. The optical system as claimed in claim 8, further comprising an auxiliary sensing assembly, for sensing the movement of the movable part, wherein:
the auxiliary sensing assembly is disposed on a supporting part;
the auxiliary sensing assembly includes a first auxiliary sensing element and a second auxiliary sensing element;
a capacitance is formed between the first auxiliary sensing element and the second auxiliary sensing element; and
when the movable part moves, the capacitance value changes.

10. The optical system as claimed in claim 1, wherein:
the first driving assembly is for driving the movable part to move relative to the fixed part in a first range of motion;

the first range of motion includes a first forward range and a first reverse range; and the absolute values of the first forward range and the first reverse range are the same.

11. The optical system as claimed in claim 10, wherein:

the second driving assembly is for driving the movable part to move relative to the fixed part in a second range of motion;

the second range of motion includes a second forward range and a second reverse range; and the absolute values of the second forward range and the second reverse range are different.

12. The optical system as claimed in claim 11, wherein:

the first range of motion is different from the second range of motion; and the first range of motion is greater than the second range of motion.

13. The optical system as claimed in claim 11, wherein:

the first driving assembly and the second driving assembly are for simultaneously driving the movable part to move within a limit range relative to the fixed part;

the limit range is greater than the first range of motion; and the limit range is greater than the second range of motion.

14. The optical system as claimed in claim 1, wherein:

the first driving assembly is disposed on a first movable part surface of the movable part;

the second driving assembly is disposed on a second movable part surface of the movable part;

the first movable part surface and the second movable part surface face different directions;

when viewed along the direction perpendicular to the first movable part surface, the first driving assembly and the second driving assembly at least partially overlap.

15. The optical system as claimed in claim 1, wherein the second driving assembly has piezoelectric material or shape memory alloys.

16. The optical system as claimed in claim 1, further comprising a control assembly, wherein:

the control assembly sends a first driving signal to the first driving assembly to generate the first driving force;

the control assembly sends a second driving signal to the second driving assembly to generate the second driving force;

the first driving signal and the second driving signal are periodic signals;

the first driving signal and the second driving signal have the same period; and the first driving signal and the second driving signal have different phases.

* * * * *